US011528641B2

(12) United States Patent
Mitra et al.

(10) Patent No.: US 11,528,641 B2
(45) Date of Patent: Dec. 13, 2022

(54) TRANSMISSION CONTROL PROTOCOL (TCP) AND/OR USER DATAGRAM PROTOCOL (UDP) RECEIVE OFFLOADING

(71) Applicant: QUALCOMM Incorporated, San Diego, CA (US)

(72) Inventors: Alok Mitra, San Diego, CA (US); Srinivas Reddy Mudireddy, San Diego, CA (US); Vaibhav Kumar, Encinitas, CA (US); Haim Snapy, San Diego, CA (US); Uppinder Babbar, San Diego, CA (US); Dan Gilboa Waizman, San Diego, CA (US); Vamsi Dokku, San Diego, CA (US); Arunn Coimbatore Krishnamurthy, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,167

(22) Filed: Jul. 21, 2020

(65) Prior Publication Data

US 2021/0029587 A1    Jan. 28, 2021

Related U.S. Application Data

(60) Provisional application No. 62/879,351, filed on Jul. 26, 2019.

(51) Int. Cl.
*H04W 28/10* (2009.01)
*H04W 28/02* (2009.01)
*H04L 69/16* (2022.01)

(52) U.S. Cl.
CPC ............ *H04W 28/10* (2013.01); *H04L 69/16* (2013.01); *H04W 28/0278* (2013.01)

(58) Field of Classification Search
None
See application file for complete search history.

(56) References Cited

U.S. PATENT DOCUMENTS

| 8,300,641 | B1 * | 10/2012 | Vincent | ............... H04L 61/1505 370/392 |
| 8,825,900 | B1 | 9/2014 | Gross, IV et al. | |
| 2004/0054813 | A1 | 3/2004 | Boucher et al. | |
| 2005/0213603 | A1 * | 9/2005 | Karighattam | ....... H04L 63/0485 370/463 |

(Continued)

OTHER PUBLICATIONS

International Search Report and Written Opinion—PCT/US2020/070311—ISA/EPO—dated Oct. 27, 2020.

*Primary Examiner* — Kenny S Lin
(74) *Attorney, Agent, or Firm* — Qualcomm Incorporated

(57) ABSTRACT

Various aspects of the present disclosure generally relate to wired and/or wireless communication. In some aspects, a device may receive a plurality of data packets at a modem of the device. The device may group, at the modem of the device, payloads of a first subset of the plurality of data packets into a container. The device may transfer, to a processor of the device and using the modem, the container via a first interface channel. The device may transfer, to the processor and using the modem, a second subset of the plurality of data packets via a second interface channel. Numerous other aspects are provided.

30 Claims, 10 Drawing Sheets

(56) References Cited

U.S. PATENT DOCUMENTS

| | | |
|---|---|---|
| 2006/0104303 A1 | 5/2006 | Makineni et al. |
| 2007/0064737 A1 | 3/2007 | Williams |
| 2008/0198787 A1* | 8/2008 | Nguyen ................ H04L 1/0084 370/315 |
| 2012/0250686 A1* | 10/2012 | Vincent ................... H04L 45/64 370/392 |
| 2013/0170451 A1* | 7/2013 | Krause .................... H04L 69/14 370/329 |
| 2017/0325124 A1* | 11/2017 | Mitra ....................... H04L 47/34 |
| 2018/0184326 A1* | 6/2018 | Ben-Haim .............. H04L 69/22 |
| 2019/0020587 A1 | 1/2019 | Snapy et al. |
| 2019/0058780 A1* | 2/2019 | Gil ......................... G06F 13/128 |

\* cited by examiner

| Header Type | Checksum Valid | Number of NLs | Close Value | Close Type | Context ID |
|---|---|---|---|---|---|
| | Packet Length | | Checksum Error Bitmap | | Quantity of Packets |
| | Packet Length | | Checksum Error Bitmap | | Quantity of Packets |
| | Packet Length | | Checksum Error Bitmap | | Quantity of Packets |
| | Packet Length | | Checksum Error Bitmap | | Quantity of Packets |
| | Packet Length | | Checksum Error Bitmap | | Quantity of Packets |
| | Packet Length | | Checksum Error Bitmap | | Quantity of Packets |

Transfer Ring Element Format

| Off | Bits | Field | Description |
|---|---|---|---|
| 0 | 63:48 | LEN | Range: E.g., 1 to 65535 |
| | 47:41 | Reserved | |
| | 40:0 | PTR | Pointer to data buffer address |
| 8 | 63:56 | Reserved | |
| | 55:48 | TYPE | Coalescing Element (0x8) |
| | 47:32 | Reserved | |
| | 31:0 | Cookie | Software cookie, to be provided back in a completion event, referencing the buffer address (such as the buffer's virtual or physical address) |

Completion Event Format

| Off | Bit | Field | Description |
|---|---|---|---|
| 0 | 63:32 | Reserved | |
| | 31:0 | Cookie | Software cookie provided in the Transfer Ring Element, referencing the buffer address |
| 8 | 31:24 | CODE | Completion status of the transfer |
| | 23:16 | CCID | Coalescing Context ID |
| | 15:0 | LEN | Quantity of bytes transferred by the last Transfer Ring Element pointed to by PTR |
| 12 | 31:24 | CHID | ID of the channel that generated the event |
| | 23:16 | TYPE | Coalescing completion event (0x40) |
| | 15:0 | Reserved | |

FIG. 9

TRANSMISSION CONTROL PROTOCOL (TCP) AND/OR USER DATAGRAM PROTOCOL (UDP) RECEIVE OFFLOADING

CROSS-REFERENCE TO RELATED APPLICATION

This patent application claims priority to U.S. Provisional Patent Application No. 62/879,351, filed on Jul. 26, 2019, entitled "TRANSMISSION CONTROL PROTOCOL (TCP) AND/OR USER DATAGRAM PROTOCOL (UDP) RECEIVE OFFLOADING," and assigned to the assignee hereof. The disclosure of the prior application is considered part of and is incorporated by reference into this patent application.

FIELD OF THE DISCLOSURE

Aspects of the present disclosure generally relate to wired and/or wireless communication and to techniques and apparatuses for transmission control protocol (TCP) and/or user datagram protocol (UDP) receive offloading.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wired and/or wireless communication, performed by a device, may include receiving a plurality of data packets at a modem of the device; grouping, at the modem of the device, payloads of a first subset of the plurality of data packets into a container; transferring, to a processor of the device and using the modem, the container via a first interface channel; and transferring, to the processor and using the modem, a second subset of the plurality of data packets via a second interface channel.

In some aspects, a device for wired and/or wireless communication may include memory and one or more processors operatively coupled to the memory. The memory and the one or more processors may be configured to receive a plurality of data packets at a modem of the device; group, at the modem of the device, payloads of a first subset of the plurality of data packets into a container; transfer, to a processor of the device and using the modem, the container via a first interface channel; and transfer, to the processor and using the modem, a second subset of the plurality of data packets via a second interface channel.

In some aspects, a non-transitory computer-readable medium may store one or more instructions for wired and/or wireless communication. The one or more instructions, when executed by one or more processors of a device, may cause the one or more processors to receive a plurality of data packets at a modem of the device; group, at the modem of the device, payloads of a first subset of the plurality of data packets into a container; transfer, to a processor of the device and using the modem, the container via a first interface channel; and transfer, to the processor and using the modem, a second subset of the plurality of data packets via a second interface channel.

In some aspects, an apparatus for wired and/or wireless communication may include means for receiving a plurality of data packets at a modem of the apparatus; means for grouping, at the modem of the apparatus, payloads of a first subset of the plurality of data packets into a container; means for transferring, to a processor of the apparatus and using the modem, the container via a first interface channel; and means for transferring, to the processor and using the modem, a second subset of the plurality of data packets via a second interface channel.

Aspects generally include a method, apparatus, system, computer program product, non-transitory computer-readable medium, user equipment, base station, wired and/or wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3-9 are diagrams illustrating examples of transmission control protocol (TCP) and/or user datagram protocol (UDP) receive offloading, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
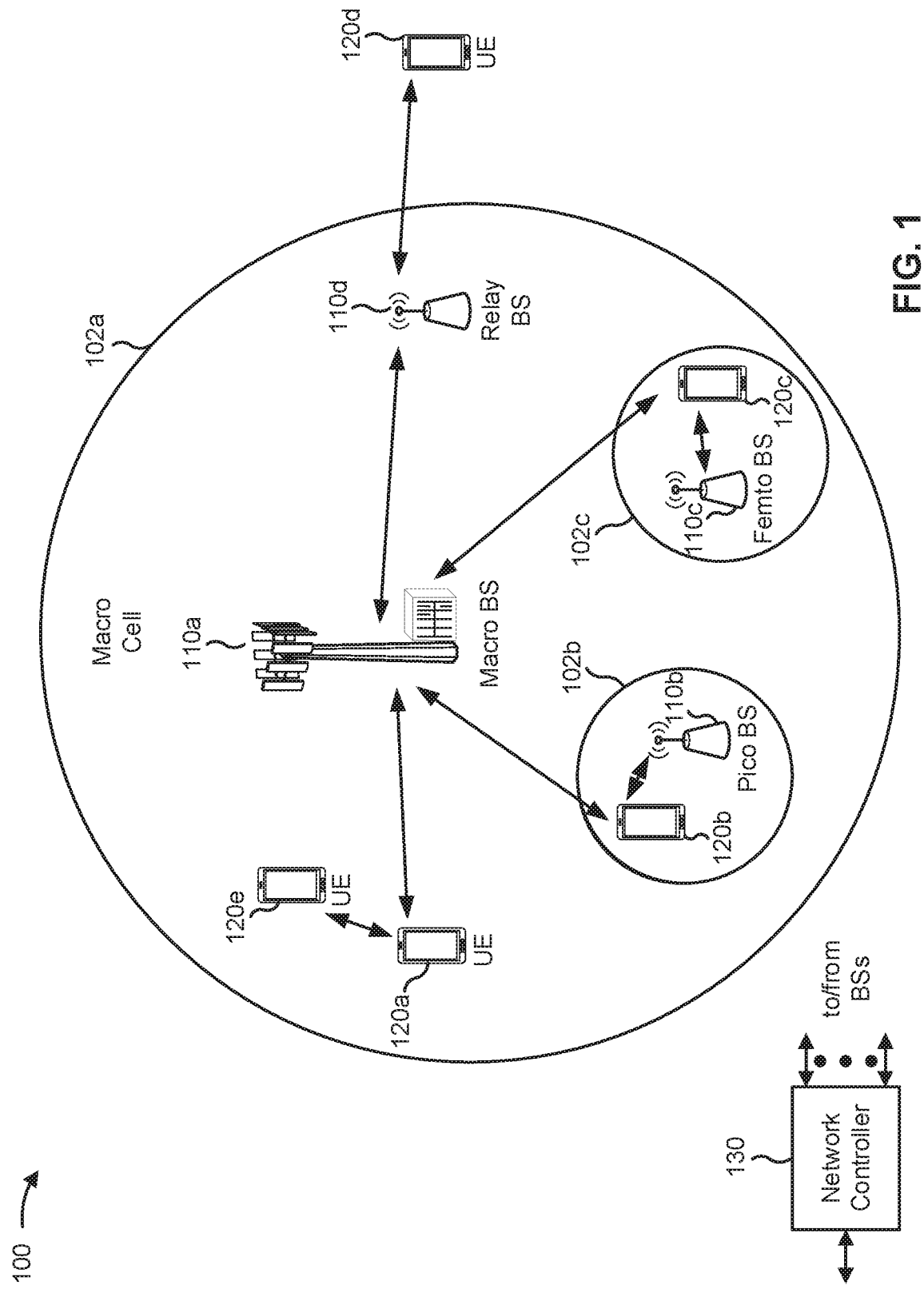
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired and/or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
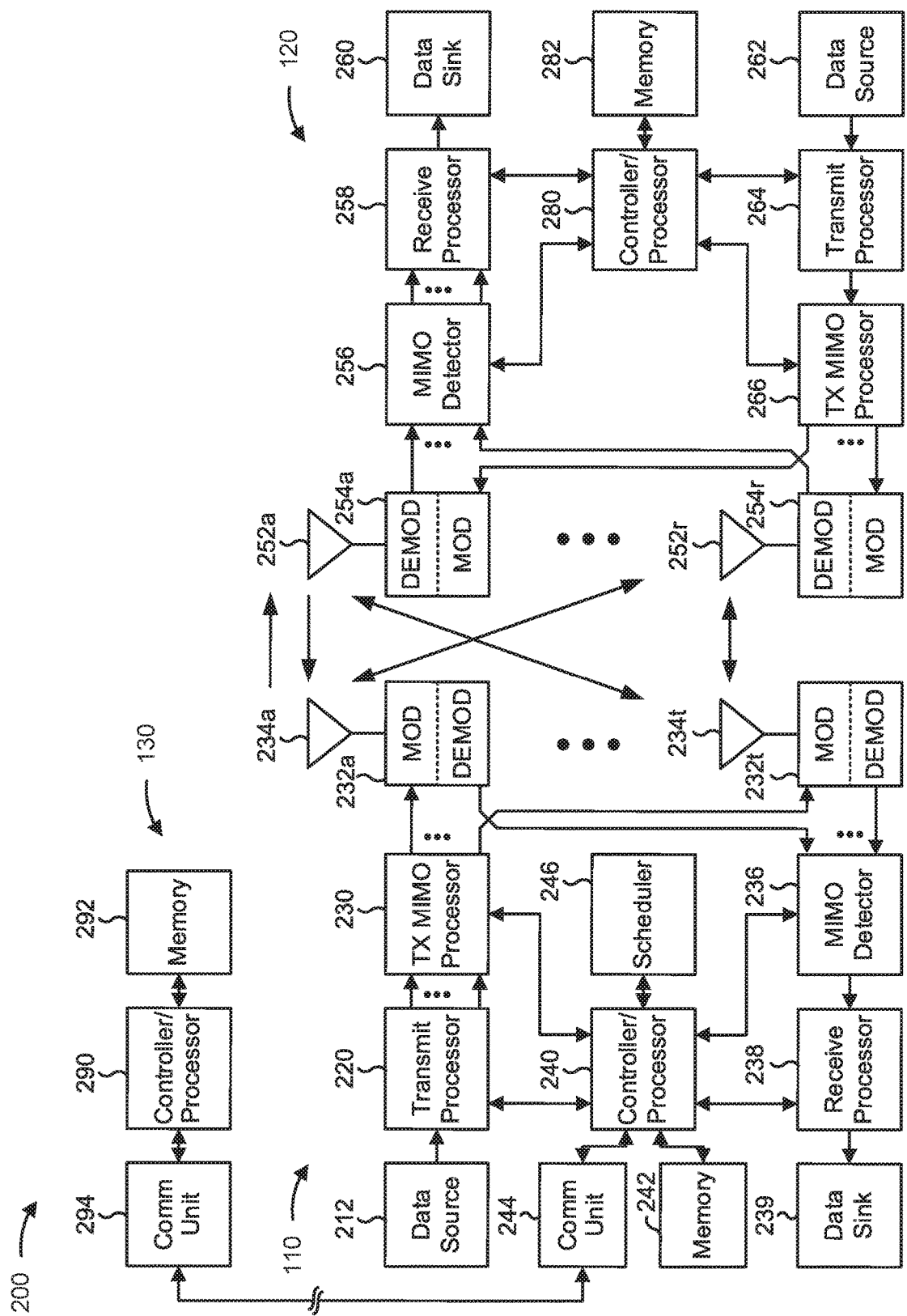
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission control protocol (TCP) and/or user datagram protocol (UDP) receive offloading, as described in more detail elsewhere herein. For example, controller/processor 240 of base station 110, controller/processor 280 of UE 120, controller/processor 290 of network controller 130, and/or any other component(s) of FIG. 2 may perform or direct operations of, for example, process 900 of FIG. 9 and/or other processes as described herein. Memories 242, 282, and 292 may store data and program codes for base station 110, UE 120, and network controller 130, respectively. In some aspects, memory 242, memory 282, and/or memory 292 may comprise a non-transitory computer-readable medium storing one or more instructions for wired and/or wireless communication. For example, the one or more instructions, when executed by one or more processors of the base station 110, the UE 120, and/or the network controller 130 may perform or direct operations of, for example, process 900 of FIG. 9 and/or other processes as described herein. A scheduler 246 may schedule UEs for data transmission on the downlink and/or uplink.

In some aspects, UE 120 may include means for receiving a plurality of data packets at a modem of the UE 120, means for grouping, at the modem of the UE 120, payloads of a first subset of the plurality of data packets into a container, means for transferring, to a processor of the UE 120 and using the modem, the container via a first interface channel, means for transferring, to the processor and using the modem, a second subset of the plurality of data packets via a second interface channel, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for receiving a plurality of data packets at a modem of the BS 110, means for grouping, at the modem of the BS 110, payloads of a first subset of the plurality of data packets into a container, means for transferring, to a processor of the BS 110 and using the modem, the container via a first interface channel, means for transferring, to the processor and using the modem, a second subset of the plurality of data packets via a second interface channel, and/or the like. In some aspects, such means may include one or more components of BS 110 described in connection with FIG. 2, such as controller/processor 240, transmit processor 220, TX MIMO processor 230, MOD 232, antenna 234, DEMOD 232, MIMO detector 236, receive processor 238, communication unit 244, and/or the like.

In some aspects, network controller 130 may include means for receiving a plurality of data packets at a modem of the network controller 130, means for grouping, at the modem of the network controller 130, payloads of a first subset of the plurality of data packets into a container, means for transferring, to a processor of the network controller 130 and using the modem, the container via a first interface channel, means for transferring, to the processor and using the modem, a second subset of the plurality of data packets via a second interface channel, and/or the like. In some aspects, such means may include one or more components of network controller 130 described in connection with FIG. 2, such as controller/processor 290, communication unit 294, memory 292, and/or the like.

As indicated above, FIG. 2 is provided as an example. Other examples may differ from what is described with regard to FIG. 2.

A device (e.g., a UE 120, a BS 110, a network controller 130, and/or the like) may communicate with another device over a data network and/or a wireless network using various communication protocols. For example, a device may transmit data packets to and/or receive data packets from another device using transmission control protocol (TCP), user datagram protocol (UDP), Internet protocol (IP), and/or the like. A modem (e.g., a receive processor 258, a controller/processor 280, and/or the like) may transfer a received data packet to a processor (e.g., a controller/processor 280 and/or the like implementing an application processor, a host processor, and/or the like) associated with the data packet. The processor may process the data packet through one or more layers of a network protocol stack (e.g., a TCP/IP-based stack, a UDP-based stack, an open systems interconnection (OSI)-based stack, and/or the like) in order to strip one or more headers of the data packet and obtain the payload of the data packet.

Processing of received data packets at the device may occur one data packet at a time (e.g., one TCP segment at a time, one UDP datagram at a time, and/or the like), which results in processing inefficiencies and/or increased data packet processing times. For example, the processor of the device may need to independently process each data packet through the one or more layers of the network protocol stack to remove or strip headers from each individual data packet. As another example, the modem may need to independently perform checksum offloading (if supported) to determine individual checksums for each data packet.

Some aspects described herein provide techniques and apparatuses associated with TCP and/or UDP receive offloading. In some aspects, a processor of a device may reduce processing inefficiencies and/or decrease data packet processing times by offloading data packet grouping to a modem of the device. The modem, for example, may combine, coalesce, and/or otherwise group data packets belonging to a particular flow or connection into a container (e.g., a coalesced TCP frame, a grouped or boxed UDP datagram, and/or the like), and may provide the container of grouped data packets to the processor for processing through a network protocol stack. The container may have a common header (or headers) such that the processor only needs to strip or remove one header (or one set of headers) from the container as opposed to individual headers (or sets of headers) from each data packet.

In some aspects, the modem is capable of providing an indication to the processor regarding containers of grouped data packets based at least in part on received sequences of corresponding data packets. Moreover, the modem is capable of providing information associated with the containers such that ungrouping, uncoalescing, unboxing, and/or the like may be performed.

In some aspects, the modem is capable of performing checksum offloading for containers of grouped data packets. The modem may provide an indication of checksum correctness for a container to the processor such that processor may take an appropriate action for data packets having an incorrect checksum.

In some aspects, the modem is capable of transferring containers of grouped data packets to the processor via a first interface channel (e.g., a coalescing interface channel) and transferring individual data packets (e.g., non-coalescable or non-groupable data packets) to the processor via a second interface channel (e.g., a non-coalescing interface channel), while maintaining an order of grouped data packets and non-grouped data packets.

Figure 3:
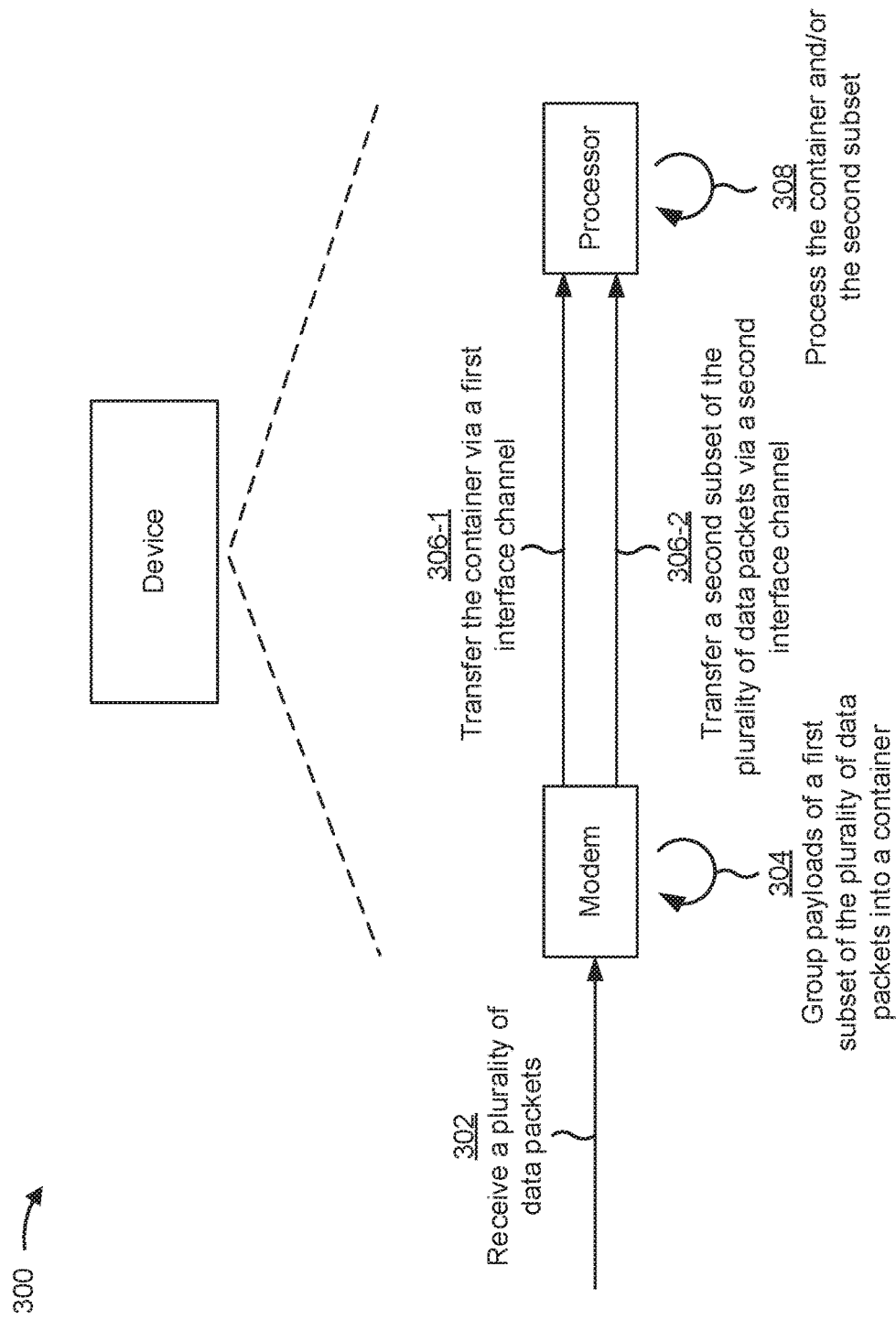

FIG. 3 is a diagram illustrating an example 300 of TCP and/or UDP receive offloading, in accordance with various aspects of the present disclosure. As shown in FIG. 3, example 300 may include communication and/or processing of data packets by a device (e.g., a UE 120, a BS 110, a network controller 130, and/or the like). The device may include, among other components and/or devices, a modem (e.g., a receive processor 238, a controller/processor 240, a communication unit 244, a receive processor 258, a controller/processor 280, a controller/processor 290, a communication unit 294, and/or the like) and a processor (e.g., a controller/processor 240, a controller/processor 280, a controller/processor 290, and/or the like). In some aspects, the modem may be included in the device or may be communicatively connected to the device. In some aspects, the processor may be a host processor, an application processor, and/or the like.

As shown in FIG. 3, and by reference number 302, the device may receive a plurality of data packets at the modem of the device. In some aspects, the device may receive the plurality of data packets from another device. The plurality of data packets may be transmitted to the device via a data network (e.g., the Internet and/or another type of packet data network), a wireless network (e.g., wireless network 100), a base station (e.g., base station 110), and/or the like.

In some aspects, the data packets may include TCP segments, UDP packets, TCP acknowledgements, Ethernet frames, data packets associated with an unstructured flow, and/or the like. In some aspects, each data packet may include a payload (e.g., application data and/or other types of data) that is wrapped in one or more headers. The one or more headers may include network protocol stack headers, such as a transport layer header (e.g., a TCP/IP header, a UDP header, an Ethernet header, and/or the like), a network layer header (e.g., an IP header and/or the like), a link layer header, and/or the like.

As further shown in FIG. 3, and by reference number 304, the modem may perform receive offloading for the processor by grouping payloads of at least a first subset of the plurality of data packets into a container. In some aspects, the modem may determine to group the payloads of the first subset of the plurality of data packets into the container based at least in part on determining that the first subset of the plurality of data packets are groupable or coalescable. In some aspects, the modem may determine that the first subset of the plurality of data packets are groupable or coalescable, for example, if the IP headers of the data packets have the same identifier field value or sequential identifiers, if the IP headers of the data packets differ only in payload length, if the TCP or UDP headers of the data packets differ only in sequence identifier, acknowledgement identifier, and/or checksum, if the TCP or UDP headers differ only in length, and/or the like. In some aspects, the modem may determine that the first subset of the plurality of data packets are not groupable or coalescable, for example, if the data packets are IP fragments, if one or more of the data packets produce a checksum error, if padding is added to one or more of the data packets, TCP options differ between the data packets, the network protocol stack headers of one or more of the data packets do not satisfy a threshold size, TCP sequence numbers of one or more of the data packets are not consecutive with other data packets, and/or the like.

In some aspects, the first subset of the plurality of data packets may include a plurality of TCP segments. The modem may group the payloads of the plurality of TCP segments into the container based at least in part on determining that the plurality of TCP segments are associated with the same TCP flow and/or same TCP connection. In some aspects, if the collective size (e.g., in bits, bytes, kilobytes, and/or the like) of the payloads of the plurality of TCP segments satisfies a threshold size (e.g., 32 Kb, 64 Kb, and/or the like), the modem may group subsets of the payloads of the plurality of TCP segments into different containers.

In some aspects, if the first subset of the plurality of data packets includes a plurality of TCP segments, the container may include a coalesced TCP frame. The modem may group or coalesce the plurality of TCP segments into the coalesced TCP frame by generating a single common coalescing frame header and/or a common set of network protocol stack headers (e.g., by grouping the plurality of TCP segments under the network protocol stack headers of a first TCP segment) and wrapping the coalesced TCP frame in the coalescing frame header, which reduces the quantity of headers that the processor is to remove or strip from the plurality of TCP segments.

In some aspects, the first subset of the plurality of data packets may include a plurality of UDP packets. The modem may group the payloads of the plurality of UDP packets into the container based at least in part on determining that the plurality of UDP packets are associated with the same UDP stream and/or same UDP connection. In some aspects, if the collective size (e.g., in bits, bytes, kilobytes, and/or the like) of the payloads of the plurality of UDP packets satisfies a threshold size (e.g., 31 Kb, 63 Kb, and/or the like), the modem may group subsets of the payloads of the plurality of UDP packets into different containers.

In some aspects, if the first subset of the plurality of data packets includes a plurality of UDP packets, the container may include a grouped or boxed UDP datagram. The modem may group or coalesce the plurality of UDP packets into the grouped UDP datagram by generating a single common grouping UDP header and/or a common set of network protocol stack headers (e.g., by grouping the plurality of UDP packets under the network protocol stack headers of a first UDP packet) and wrapping the grouped UDP datagram in the grouping UDP header, which reduces the quantity of headers that the processor is to remove or strip from the plurality of UDP packets.

In some aspects, the modem may group the payloads of the first subset of the plurality of data packets into the container such that the container has a plurality of headers. The plurality of headers may be a plurality of common coalescing frame headers, a plurality of grouping UDP headers, the original headers of the plurality of data packets (e.g., such that the plurality of data packets are accumulated per flow as opposed to being coalesced), and/or other types of headers.

As further shown in FIG. 3, and by reference number 306, the modem may transfer the container to the processor via a first interface channel (e.g., a coalescing interface channel) (306-1) and/or may transfer a second subset of the plurality of data packets to the processor via a second interface channel (e.g., a non-coalescing interface channel) (306-2). The second subset of the plurality of data packets may be non-coalesced data packets. In some aspects, the modem may transfer the second subset of the plurality of data packets via the second interface channel based at least in part on determining not to coalesce or group the second subset of the plurality of data packets into a container, based at least in part on determining that the second subset of the plurality of data packets are non-coalescable or non-groupable data packets (e.g., data packets that are not capable of being grouped or coalesced), and/or the like.

In some aspects, the first interface channel and the second interface channel may be different interface channels. The interface associated with the first interface channel and the second interface channel may be a peripheral component interconnect express (PCIe) interface, a universal serial bus (USB) interface, a serial ATA (SATA) interface, an Ethernet interface, and/or another type of communication interface.

In some aspects, the modem may transfer a plurality of containers via the first interface channel and/or a plurality of non-coalesced and/or non-grouped data packets to the processor via the second interface channel. In this case, one or more of the plurality of containers may be associated with the same TCP flow or TCP connection, may be associated with different TCP flows or different TCP connections, may be associated with the same UDP stream or UDP connection, may be associated with different UDP streams or different UDP connections, and/or the like.

As further shown in FIG. 3, and by reference number 308, the processor may process the container and/or the second subset of the plurality of data packets. For example, the processor may process the container through one or more layers of a network protocol stack by removing or stripping the common frame header or common UDP header from the container and/or other common network protocol stack headers from the container to obtain the application data and/or other payload data included in the container. As another example, the processor may process the second subset of the plurality of data packets through one or more layers of a network protocol stack by removing or stripping the individual network protocol stack headers from the second subset of the plurality of data packets to obtain the application data and/or other payload data included in the second subset of the plurality of data packets.

In this way, the processor of a device may reduce processing inefficiencies and/or decrease data packet processing times by offloading data packet grouping to the modem of the device. The modem, for example, may combine, coalesce, and/or otherwise group data packets belonging to a particular flow or connection into a container (e.g., a coalesced TCP frame, a grouped or boxed UDP datagram, and/or the like), and may provide the container of grouped data packets to the processor for processing through a network protocol stack. The container may have a common header (or headers) such that the processor needs to strip or remove a single header (or a single set of headers) from the container as opposed to individual headers (or sets of headers) from each data packet.

As indicated above, FIG. 3 is provided as an example. Other examples may differ from what is described with respect to FIG. 3.

Figure 4:
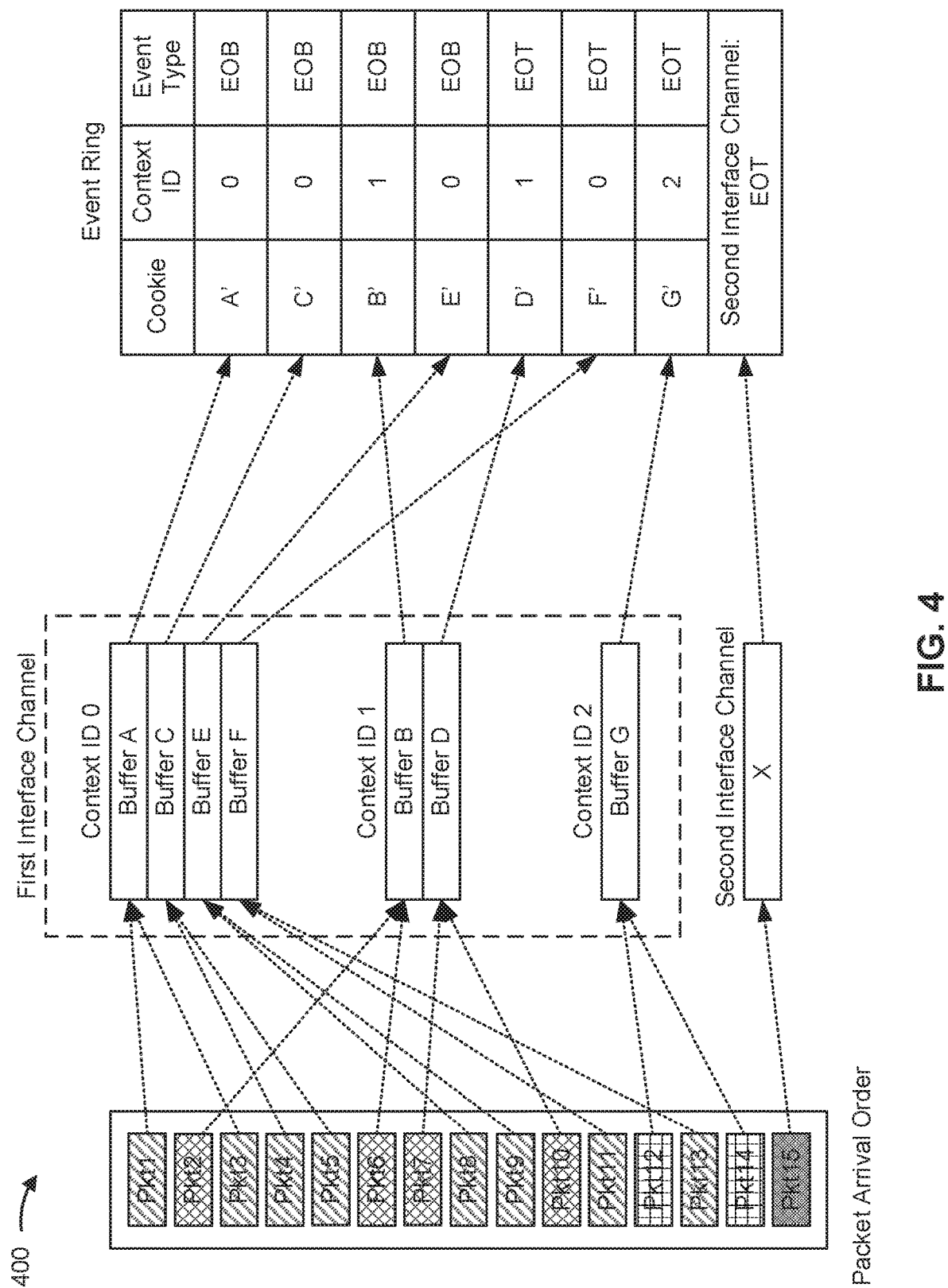

FIG. 4 is a diagram illustrating an example 400 of TCP and/or UDP receive offloading, in accordance with various aspects of the present disclosure.

As shown in FIG. 4, a device (e.g., the device described above in connection with FIG. 3 and/or another device) may receive a plurality of data packets (e.g., Packet 1 through Packet 15) at a modem of the device in a particular packet arrival order. The modem may group subsets of the plurality of data packets into a plurality of containers, may transfer the containers to a processor of the device via a first interface channel (e.g., a coalescing interface channel), and may transfer a subset of the plurality of data packets (e.g., non-grouped or non-coalesced data packets) to the processor via a second interface channel (e.g., a non-coalescing interface channel).

In some aspects, the device may utilize a plurality of concurrent coalescing interface channels (and/or groups of coalescing interface channels) and/or non-coalescing interface channels (and/or groups of non-coalescing interface channels) to permit per-processor usage in a multi-processor device. For example, the device may include a first processor that is assigned a first coalescing interface channel and a first non-coalescing interface channel, may include a second processor that is assigned a second coalescing interface channel and a second non-coalescing interface channel, and so on.

In some aspects, each container of the plurality of containers may be associated with a coalescing context identifier. For example, a first container may be associated with context identifier 0, a second container may be associated with context identifier 1, and so on.

In some aspects, to transfer the plurality of containers to the processor, the modem may store the plurality of containers across one or more buffers associated with the first interface channel. For example, the modem may store a container across a single buffer, may store a container across a plurality of buffers, and/or the like. As illustrated in the example in FIG. 4, the modem may store the data packets included in the container associated with context identifier 0 in buffer A (e.g., packet 1 and packet 3), buffer C (e.g., packet 4 and packet 5), buffer E (e.g., packet 8 and packet 9), and buffer F (e.g., packet 11 and packet 13). Continuing with the example in FIG. 4, the modem may store the data packets included in the container associated with context identifier 1 in buffer B (e.g., packet 2 and packet 6) and buffer D (e.g., packet 7 and packet 10). Continuing with the example in FIG. 4, the modem may store the data packets included in the container associated with context identifier 2 in buffer G (e.g., packet 12 and packet 14). As further shown in FIG. 4, the modem may store the non-grouped or non-coalesced data packets in a buffer associated with the second interface channel.

As illustrated in FIG. 4, the modem may utilize buffers out of order to store data packets, whereas the non-grouped or non-coalesced data packets may be stored in the buffer associated with the second interface channel in the order in which the non-grouped or non-coalesced data packets are received. As an example, when the modem receives packet 1, the modem may assign a free buffer (e.g., buffer A) to a container associated with context identifier 0 and may store packet 1 in buffer A. The next packet (e.g., packet 2) that modems receives may be associated with a different TCP flow or UDP stream, in which case the modem may initiate another container (e.g., context identifier 1) for the TCP flow or UDP stream and may assign the next available buffer (e.g., buffer B) to the container.

As further illustrated in FIG. 4, in some cases, the modem may fill a buffer assigned to a container when storing data packets in the buffer. This may be referred to as a buffer completion. In this case, the modem may assign the next available buffer to the container and may store data packets of the container in the new buffer. For example, if the modem fills buffer A with data packets of the container associated with context identifier 0, the modem may assign buffer C (e.g., because buffer B was already assigned to the container associated with context identifier 1) to the container associated with context identifier 0 and may store data packets in buffer C.

The modem may continue to assign buffers and store data packets in a similar manner as described above. Moreover, and as illustrated in FIG. 4, the modem may maintain a log of completion events in an event ring. The event ring may include a data structure, one or more data containers, and/or the like to indicate, to the processor, memory usage of the modem. The event ring may be a common event ring between the first interface channel and the second interface channel. Moreover, the modem may maintain the event ring such that completion events are logged in order in which the completion events occurred. For example, the completion of buffer A (e.g., the storage of packet 3 in buffer A) occurred first and is logged first in the event ring, the completion of buffer C (e.g., the storage of packet 5 in buffer C) occurred second and is logged second in the event ring, the completion of buffer B (e.g., the storage of packet 6 in buffer B) occurred third and is logged third in the event ring, and so on.

A completion event entry in the event ring may include information associated with the completion event. For example, a completion event entry may point to a software cookie associated with the buffer that is associated with the completion event, a context identifier of the container to which the buffer is assigned, an event type associated with the completion event, and/or the like. Additionally and/or alternatively, the completion event entry may include a memory address at which the data packets in the buffer are stored, may specify the length of memory used by the modem for purposes of direct memory access (DMA), and/or the like.

In some aspects, the software cookie associated with a buffer may be stored in a transfer ring associated with the first interface channel (e.g., a coalescing transfer ring). The software cookie may include an indication of a buffer address associated with the buffer, such as a virtual address, a physical address, and/or the like. In some aspects, the processor may transmit an indication of the software cookie associated with the buffer in a coalescing transfer ring element via the coalescing transfer ring, may provide an indication of the buffers that are associated with the first interface channel via the coalescing transfer ring, may provide an indication of the buffers that are associated with the second interface channel via the non-coalescing transfer ring, and/or the like.

In some aspects, the coalescing transfer ring may be different from the transfer ring associated with the second interface channel (e.g., a non-coalescing transfer ring) the first interface channel and the second interface channel may use the same transfer ring. The transfer rings may include the same data structure or separate data structures, the same data container or separate data containers, and/or the like, which stores memory addresses, memory lengths, software cookies, and/or the like associated with data buffers of the first interface channel and/or the second interface channel.

In some aspects, an event type of a completion event may be based at least in part on a reason that the buffer associated with the completion event was closed. For example, an end of buffer (EOB) event type may indicate that the buffer was closed due to the buffer being filled. As another example, an end of transmission (EOT) event type may indicate that the buffer was closed due to the transfer of data packets into the buffer being terminated. In some aspects, an EOT event type may be triggered by a flag being set in a data packet (e.g., a TCP FIN/PUSH flag) that indicates the container (and thus, the buffer), in which the data packet is to be stored, is to be closed. In some aspects, an EOT event type may be triggered by the modem determining that a data packet is not capable of being grouped into a container to which the buffer is assigned.

As indicated above, FIG. 4 is provided as an example. Other examples may differ from what is described with respect to FIG. 4.

Figure 5:
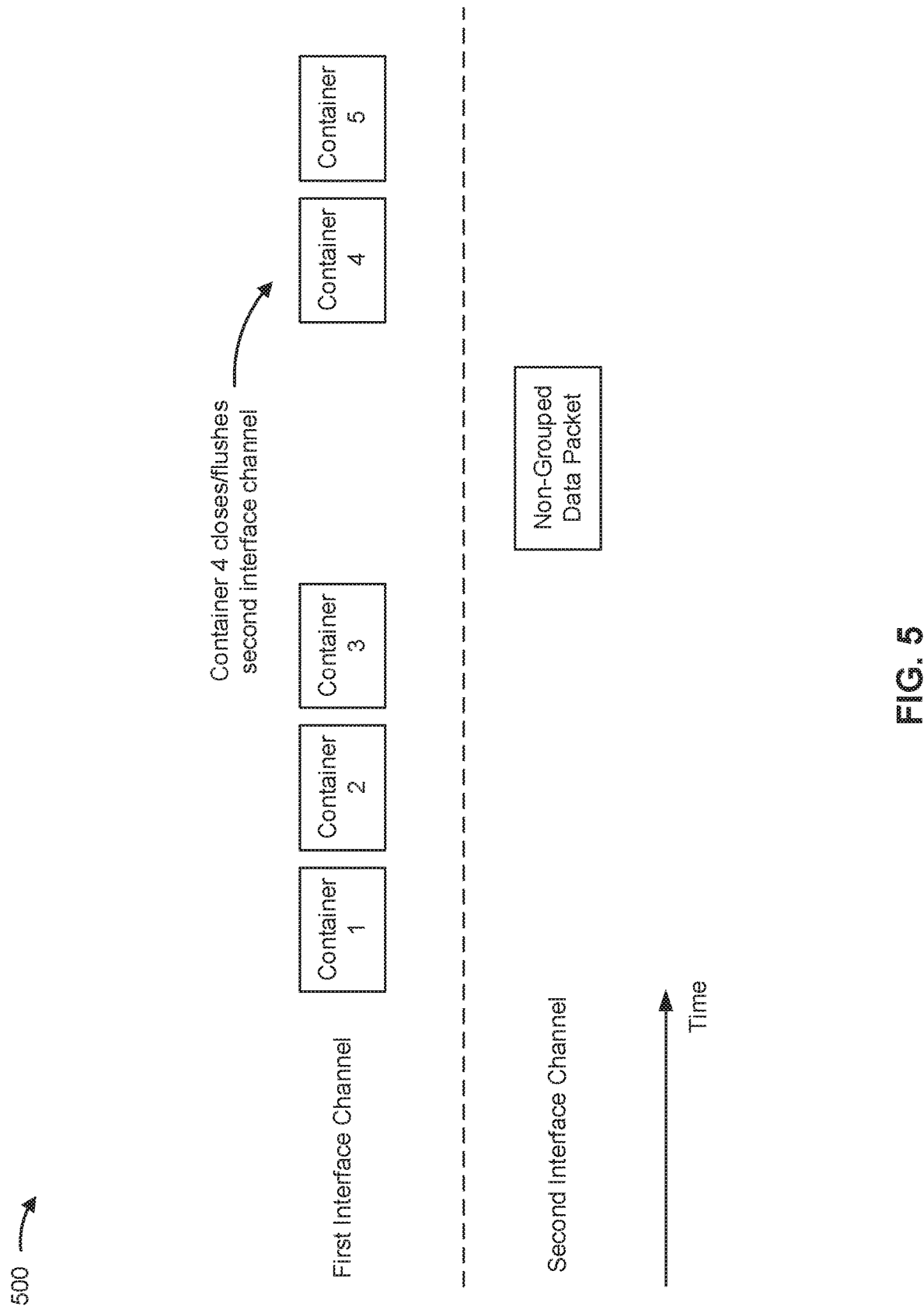

FIG. 5 is a diagram illustrating an example 500 of TCP and/or UDP receive offloading, in accordance with various aspects of the present disclosure.

As shown in FIG. 5, a device (e.g., the device described above in connection with FIG. 3 and/or another device) may receive a plurality of data packets at a modem of the device. The modem may group subsets of the plurality of data packets into a plurality of containers (e.g., containers 1 through 5), may transfer the containers to a processor of the device via a first interface channel (e.g., a coalescing interface channel), and may transfer a subset of the plurality of data packets (e.g., non-grouped or non-coalesced data packets) to the processor via a second interface channel (e.g., a non-coalescing interface channel).

As shown in FIG. 5, the modem may transfer containers 1 through 3 to the processor before transferring a non-grouped or non-coalesced data packet. As further shown in FIG. 5, the modem may transfer containers 4 and 5 after transferring the non-grouped or non-coalesced data packet. To maintain an ordering of buffer completions in an event ring (e.g., the event ring described above in connection with FIG. 4 and/or another event ring), the modem may close or flush the second interface channel and/or the buffer assigned to the second interface channel. In this way, the modem logs a completion event for the buffer assigned to the second interface channel between the completion of the buffer associated with container 3 and the completion of the buffer associated with container 4, which ensures the correct ordering of buffer completions in the event ring.

As indicated above, FIG. 5 is provided as an example. Other examples may differ from what is described with respect to FIG. 5.

Figure 6:
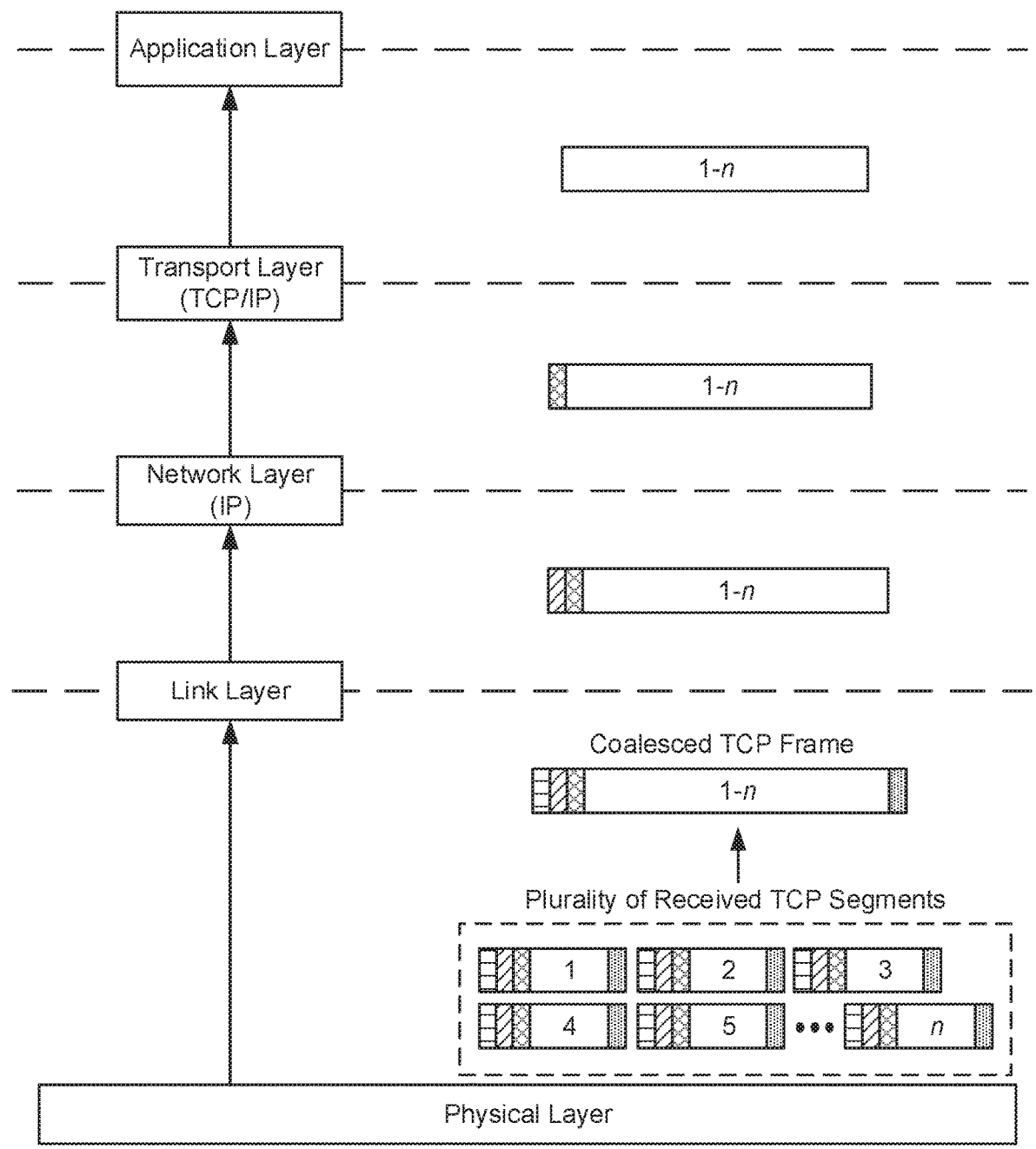

FIG. 6 is a diagram illustrating an example 600 of TCP receive offloading, in accordance with various aspects of the present disclosure.

As shown in FIG. 6, a device (e.g., the device described above in connection with FIG. 3 and/or another device) may receive a plurality of TCP segments (e.g., TCP segment 1 through n) at a modem of the device. The modem may group the plurality of TCP segments into a container, such as a coalesced TCP frame, and may transfer the coalesced TCP frame to a processor of the device via a first interface channel (e.g., a coalescing interface channel). The modem may group or coalesce the plurality of TCP segments into the coalesced TCP frame by generating a single common coalescing frame header and/or a common set of network protocol stack headers (e.g., by grouping the plurality of TCP segments under the network protocol stack headers of a first TCP segment) and wrapping the coalesced TCP frame in the coalescing frame header, which reduces the quantity of headers that the processor is to remove or strip from the plurality of TCP segments.

The processor may receive the coalesced TCP frame and may process the coalesced TCP frame through one or more layers of a network protocol stack. For example, and as illustrated in FIG. 6, the processor may remove or strip one or more link layer headers from the coalesced TCP frame, may remove or strip one or more network layer headers from the coalesced TCP frame, and/or may remove or strip one or more transport layer headers from the coalesced TCP frame. The processor may provide the remaining payload date to the application layer.

As indicated above, FIG. 6 is provided as an example. Other examples may differ from what is described with respect to FIG. 6.

Figure 7:
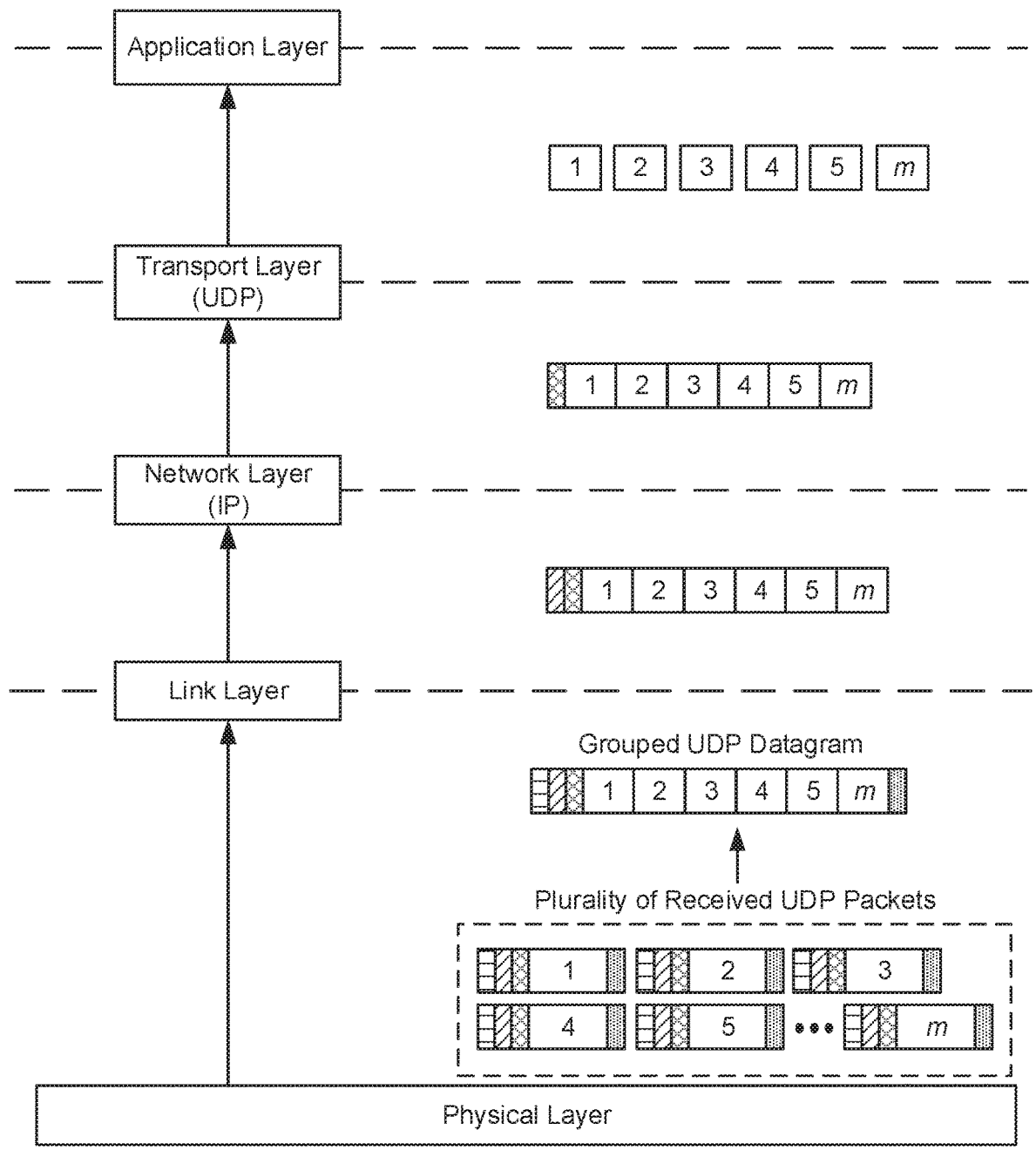

FIG. 7 is a diagram illustrating an example 700 of UDP receive offloading, in accordance with various aspects of the present disclosure.

As shown in FIG. 7, a device (e.g., the device described above in connection with FIG. 3 and/or another device) may receive a plurality of UDP packets (e.g., UDP packet 1 through n) at a modem of the device. The modem may group the plurality of UDP packets into a container, such as a grouped UDP datagram, and may transfer the grouped UDP datagram to a processor of the device via a first interface channel (e.g., a coalescing interface channel). The modem may group or coalesce the plurality of UDP packets into the grouped UDP datagram by generating a single common grouping UDP header and/or a common set of network protocol stack headers (e.g., by grouping the plurality of UDP packets under the network protocol stack headers of a first UDP packet) and wrapping the grouped UDP datagram in the grouping UDP header, which reduces the quantity of headers that the processor is to remove or strip from the plurality of UDP packets.

The processor may receive the grouped UDP datagram and may process the grouped UDP datagram through one or more layers of a network protocol stack. For example, and as illustrated in FIG. 7, the processor may remove or strip one or more link layer headers from the grouped UDP datagram, may remove or strip one or more network layer headers from the grouped UDP datagram, and/or may remove or strip one or more transport layer headers from the grouped UDP datagram. The processor may provide the remaining payload date to the application layer.

As indicated above, FIG. 7 is provided as an example. Other examples may differ from what is described with respect to FIG. 7.

FIG. 8 is a diagram illustrating an example 800 of a common header for grouping or coalescing data packets, in accordance with various aspects of the present disclosure. In some aspects, a device (e.g., the device described above in connection with FIG. 3 and/or another device) may generate a container of a plurality of data packets by wrapping the payloads of the plurality data packets in a common header, such as the common header illustrated in FIG. 8.

As shown in FIG. 8, the common header may include a plurality of fields. For example, the plurality of fields may include a header type field, a checksum validity field, an NL quantity field, a close value field, a close type field, a context identifier field, one or more packet length fields, one or more checksum error bitmap fields, one or more quantity of packets fields, and/or the like. While the common header is illustrated in example 800 as having a particular configuration and/or quantity of fields, the common header may include a greater and/or fewer quantity of fields, may include different fields that the fields illustrated in FIG. 8, and/or the like.

In some aspects, the header type field may include one or more bits (e.g., 7 bits and/or another quantity of bits) that may be used to indicate that the common header is a coalescing frame header (e.g., which may be used for a coalescing TCP frame or a grouped UDP datagram). In some aspects, the checksum validity field may be used if a modem of the device performs checksum offloading for the processor of the device. The checksum validity field may include one or more bits (e.g., 1 bit and/or the like) to indicate whether a checksum of the container is valid, which permits the device to perform checksum validation across a plurality of data packets as opposed to performing checksum validation for individual data packets.

In some aspects, the close type and close value fields may include one or more bits (e.g., 4 bits for each field and/or the like) that may be used to indicate a reason for closing the container associated with the common header. For example, the one or more bits may indicate that the container was closed due to a quantity of NL fields in the common header satisfying a threshold quantity, due to a quantity of data packets in the container satisfying a threshold quantity, due to a byte size of the container satisfying a threshold size, due to a forced close, due to an eviction (e.g., based at least in part on a least recently used (LRU) eviction policy), and/or the like). The context identifier field may include one or more bits (e.g., 4 bits and/or the like) that may be used to indicate a context identifier associated with the container. The threshold byte size for the container and/or the threshold quantity of data packets for the container may be negotiated between the modem and the processor. For example, the processor may specify the threshold byte size for the container and/or the threshold quantity of data packets for the container, and the modem may group payloads of data packets into the container such that the container satisfies the threshold byte size for the container and/or the threshold quantity of data packets for the container.

In some aspects, the NL quantity field may include a plurality of bits (e.g., 3 bits and/or the like) that may be used to indicate a quantity of plurality of packet number packet length (NL) fields included in the common header. In some aspects, an NL field may include a row or a combination of a packet length field, a checksum error bitmap field, and a quantity of packets field. A packet length field may include one or more bits (e.g., 16 bits and/or the like) that may be used to indicate a particular data packet length of data packets included in the container. The quantity of packets field associated with a packet length field (e.g., in the same row as the packet length field) may include one or more bits (e.g., 8 bits) that may be used to indicate a quantity of data packets, included in the container, that are of the packet length indicated in the associated packet length field. In some aspects, the quantity of packets field may include the quantity of consecutive data packets of the same packet length that were stored in the container. In this case, the modem may traverse to a new NL field (e.g., a new row in the common header) when a data packet of a different packet length is received. As a result, some rows of NL fields may include the same packet length in the common header.

In some aspects, the checksum error bitmap field may include one or more bits (e.g., 48 bits and/or the like) that may be used to identify a data packet (e.g., a TCP segment or UDP packet) for which the modem detected a checksum error. In some aspects, the checksum error bitmap field may be spread across NL fields in the common header. For example, 8 bits and/or another quantity of bits may be included in each NL field for the checksum error bitmap field.

As indicated above, FIG. 8 is provided as an example. Other examples may differ from what is described with respect to FIG. 8.

FIG. 9 is a diagram illustrating an example 900 of a transfer ring element format and a completion event format, in accordance with various aspects of the present disclosure.

In some aspects, a processor of a device (e.g., the device described above in connection with FIG. 3 and/or another device) may use the transfer ring element format to provide a transfer ring element to a modem of the device via a transfer ring. The transfer ring element may identify one or more parameters for a buffer associated with coalescing interface channel or a non-coalescing interface channel.

As shown in FIG. 9, the transfer ring element format may include a plurality of fields, such as a length field (LEN), a pointer field (PTR), a type field (TYPE), a software cookie field (Cookie), and/or the like. In some aspects, the transfer ring element format may include a greater or fewer quantities of fields, may include different fields, and/or the like. In some aspects, the length field may be used to indicate the available size of a buffer (e.g., in bits, in bytes, in kilobytes, and/or the like).

In some aspects, the pointer field may be used to point to a data buffer address of the buffer, which may be a logical address, a physical address, and/or the like. In some aspects, the type field may identify a transfer ring element type of a transfer ring element. For example, the type field may indicate that a transfer ring element is a coalescing element (e.g., to indicate that a buffer is to be assigned to a coalescing interface channel. In some aspects, the software cookie field may identify a software cookie, associated with a buffer, that the modem is to use when providing completion events to the processor. The software cookie may identify the buffer, may identify the address of the buffer, and/or the like.

In some aspects, the modem of the device may use the completion event format to provide a completion event to the processor via an event ring. The completion event format may identify one or more parameters for a completion event associated with a buffer.

As shown in FIG. 9, the completion event format may include a plurality of fields, such as a software cookie field (Cookie), a completion status field (CODE), a context identifier field (e.g., a coalescing context identifier (CCID)), a length field (LEN), a channel identifier field (CHID), a type field (TYPE), and/or the like. In some aspects, the completion event format may include a greater or fewer quantities of fields, may include different fields, and/or the like.

In some aspects, the software cookie field may be used to identify a software cookie of a buffer associated with a completion event. In some aspects, the completion status field may indicate whether the transfer of the data packets to the buffer is complete. In some aspects, the context identifier field may identify a context identifier associated with the buffer. In some aspects, the length field may be used to indicate the amount of the available size of the buffer that was used to store the data packets in the buffer (e.g., in bits, in bytes, in kilobytes, and/or the like). In some aspects, the channel identifier filed may indicate a channel identifier of the interface channel (e.g., coalescing interface channel, non-coalescing interface channel, and/or the like) to which the buffer is assigned. In some aspects, the type field may indicate a completion event type of the completion event (e.g., coalescing completion event, non-coalesced data packet transfer complete event, and/or the like).

As indicated above, FIG. 9 is provided as an example. Other examples may differ from what is described with respect to FIG. 9.

Figure 10:
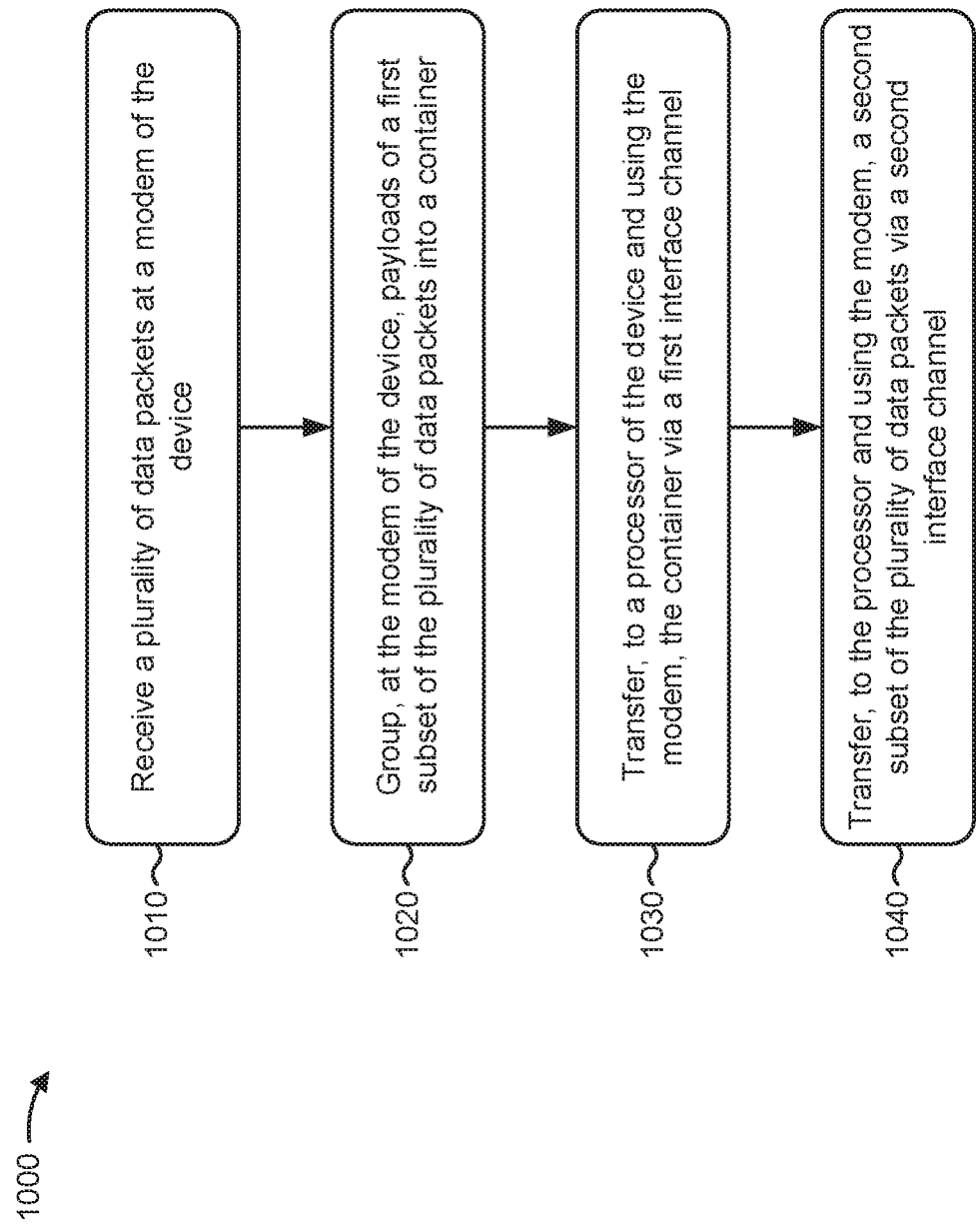
FIG. 10 is a diagram illustrating an example process performed, for example, by a device, in accordance with various aspects of the present disclosure.

FIG. 10 is a diagram illustrating an example process 1000 performed, for example, by a device, in accordance with various aspects of the present disclosure. Example process 1000 is an example where a device (e.g., UE 120, BS 110, network controller 130, and/or the like) performs operations associated with TCP and/or UDP receive offloading.

As shown in FIG. 10, in some aspects, process 1000 may include receiving a plurality of data packets at a modem of the device (block 1010). For example, the device (e.g., using transmit processor 220, receive processor 238, controller/processor 240, memory 242, communication unit 244, receive processor 258, transmit processor 264, controller/processor 280, memory 282, controller/processor 290, memory 292, communication unit 294, and/or the like) may receive a plurality of data packets at a modem of the device, as described above.

As further shown in FIG. 10, in some aspects, process 1000 may include grouping, at the modem of the device, payloads of a first subset of the plurality of data packets into a container (block 1020). For example, the device (e.g., using transmit processor 220, receive processor 238, controller/processor 240, memory 242, communication unit 244, receive processor 258, transmit processor 264, controller/processor 280, memory 282, controller/processor 290, memory 292, communication unit 294, and/or the like) may group, at the modem of the device, payloads of a first subset of the plurality of data packets into a container, as described above.

As further shown in FIG. 10, in some aspects, process 1000 may include transferring, to a processor of the device and using the modem, the container via a first interface channel (block 1030). For example, the device (e.g., using transmit processor 220, receive processor 238, controller/processor 240, memory 242, communication unit 244, receive processor 258, transmit processor 264, controller/processor 280, memory 282, controller/processor 290, memory 292, communication unit 294, and/or the like) may transfer, to a processor of the device and using the modem, the container via a first interface channel, as described above.

As further shown in FIG. 10, in some aspects, process 1000 may include transferring, to the processor and using the modem, a second subset of the plurality of data packets via a second interface channel (block 1040). For example, the device (e.g., using transmit processor 220, receive processor 238, controller/processor 240, memory 242, communication unit 244, receive processor 258, transmit processor 264, controller/processor 280, memory 282, controller/processor 290, memory 292, communication unit 294, and/or the like) may transfer, to the processor and using the modem, a second subset of the plurality of data packets via a second interface channel, as described above.

Process 1000 may include additional aspects, such as any single aspect or any combination of aspects described below and/or in connection with one or more other processes described elsewhere herein.

In a first aspect, the first subset of the plurality of data packets comprises a plurality of TCP segments associated with a same TCP flow, and the container comprises a coalesced TCP frame having a coalescing frame header, or the first subset of the plurality of data packets comprises a plurality of UDP packets associated with a same UDP stream and the container comprises a grouped UDP datagram having a single UDP header. In a second aspect, alone or in combination with the first aspect, a header associated with the container includes at least one of a context identifier field that identifies a context identifier associated with the container, a checksum validity field that identifies whether a checksum error occurred for any of the plurality of data packets, a checksum error bitmap field that identifies, if a checksum error occurred for any of the plurality of data packets, one or more data packets of the plurality of data packets associated with the checksum error, a plurality of packet number packet length (NL) fields, or an NL quantity field that identifies a quantity of NL fields included in the header.

In a third aspect, alone or in combination with one or more of the first and second aspects, the first interface channel is associated with a first transfer ring, the second interface channel is associated with a second transfer ring, and the first transfer ring and the second transfer ring are different transfer rings. In a fourth aspect, alone or in combination with one or more of the first through third aspects, process 1000 further comprises providing, to the modem and using the processor, an indication, via the first transfer ring, of one or more first buffers associated with the first interface channel and providing, to the modem and using the processor, an indication, via the second transfer ring, of one or more second buffers associated with the second interface channel.

In a fifth aspect, alone or in combination with one or more of the first through fourth aspects, transferring the container via the first interface channel comprises storing the container in the one or more first buffers based at least in part on the indication of the one or more first buffers via the first transfer ring, and transferring the second subset of the plurality of data packets via a second interface channel comprises storing the second subset of the plurality of data packets in the one or more second buffers based at least in part on the indication of the one or more second buffers via the second transfer ring. In a sixth aspect, alone or in combination with one or more of the first through fifth aspects, the container is included among a plurality of containers to be transferred to the processor via the first interface channel, and transferring the container via the first interface channel comprises storing each of the plurality of containers in a respective buffer of the one or more first buffers in an order that is based at least in part on respective activity levels of the plurality of containers.

In a seventh aspect, alone or in combination with one or more of the first through sixth aspects, process 1000 further comprises providing, to the modem and using the processor, an indication of one or more buffers associated with the first interface channel, the indication of the one or more buffers being provided in a coalescing transfer ring element via the first transfer ring, and the indication of the one or more buffers comprising an indication of a respective software cookie associated with each of the one or more buffers. In an eighth aspect, alone or in combination with one or more of the first through seventh aspects, transferring the container via the first interface channel comprises storing the container across the one or more buffers and providing, to the processor, using the modem, and based at least in part on storing the container, an indication of a coalescing completion event, the indication of the coalescing completion event being provided via a shared event ring associated with the first interface channel and the second interface channel, and the indication of the coalescing completion event identifying the respective software cookie associated with each of the one or more buffers and a coalescing context identifier associated with the container.

In a ninth aspect, alone or in combination with one or more of the first through eighth aspects, transferring the second subset of the plurality of data packets comprises providing an indication of a completion event to the processor and using the modem, the indication of the completion event being provided via the shared event ring and the indication of the coalescing completion event and the indication of the completion event being ordered in the event ring based at least in part on an order in which the container and the second subset of the plurality of data packets were transferred to the processor. In a tenth aspect, alone or in combination with one or more of the first through ninth aspects, storing the container across the one or more buffers comprises storing the container in a first buffer of the one or more buffers until the first buffer is filled and closing the first buffer based at least in part on the first buffer being filled, generating an event code and a context identifier associated with the first buffer, and storing a remainder of the container in a second buffer of the one or more buffers. In an eleventh aspect, alone or in combination with one or more of the first through tenth aspects, the container is included among a plurality of containers, and transferring the container via the first interface channel comprises transferring the plurality of containers via the first interface channel, each of the plurality of containers being associated with a respective TCP connection or UDP connection.

In a twelfth aspect, alone or in combination with one or more of the first through eleventh aspects, grouping the payloads of the first subset of the plurality of data packets into the container comprises determining that the first subset of the plurality of data packets are capable of being coalesced, and grouping the payloads of the first subset of the plurality of data packets into the container based at least in part on determining that the first subset of the plurality of data packets are capable of being coalesced, and transferring the second subset of the plurality of data packets via the second interface channel comprises determining that the second subset of the plurality of data packets are not capable of being coalesced and transferring the second subset of the plurality of data packets via the second interface channel based at least in part on determining that the second subset of the plurality of data packets are not capable of being coalesced. In a thirteenth aspect, alone or in combination with one or more of the first through twelfth aspects, grouping the payloads of the first subset of the plurality of data packets into the container comprises closing the container and generating an event code and a context identifier associated with a buffer in which the container is to be stored.

In a fourteenth aspect, alone or in combination with one or more of the first through thirteenth aspects, closing the container comprises at least one of identifying a flag, included in a data packet of the first subset of the plurality of data packets, that indicates that the container is to be closed, or determining that a data packet of the second subset of the plurality of data packets is not capable of being coalesced with the first subset of the plurality of data packets. In a fifteenth aspect, alone or in combination with one or more of the first through fourteenth aspects, process 1000 further comprises determining to transfer another container via the first interface channel and closing the second interface channel based at least in part on determining to transfer the other container via the first interface channel. In a sixteenth aspect, alone or in combination with one or more of the first through fifteenth aspects, the processor is an application processor, or a host processor, and an interface, associated with the first interface channel and the second interface channel, is a peripheral component interconnect express interface, a universal serial bus interface, a serial ATA interface, or an Ethernet interface.

In a seventeenth aspect, alone or in combination with one or more of the first through sixteenth aspects, the first subset of the plurality of data packets are associated with a same flow or a same stream and the container includes a plurality of headers associated with the same flow or the same stream. In an eighteenth aspect, alone or in combination with one or more of the first through seventeenth aspects, grouping the payloads of the first subset of the plurality of data packets into the container includes receiving, at the modem and from the processor, an indication of at least one of a threshold byte size for the container or a threshold quantity of data packets for the container and grouping, at the modem, the payloads of the first subset of the plurality of data packets into the container based at least in part on the at least one of the threshold byte size for the container or the threshold quantity of data packets for the container. In a nineteenth aspect, alone or in combination with one or more of the first through eighteenth aspects, the first subset of the plurality of data packets include a plurality of TCP segments, a plurality of UDP packets, a plurality of Ethernet frames, or a plurality of unstructured packets.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a device, comprising:
   receiving a plurality of data packets at a modem of the device;
   grouping, at the modem of the device, payloads of a first subset of the plurality of data packets into a container of a plurality of containers associated with a transmission control protocol (TCP) connection or user datagram protocol (UDP) connection;
   transferring, from the modem and to a processor of the device, the container via a first interface channel associated with a first transfer ring;
   transferring, from the modem and to the processor, a second subset of the plurality of data packets via a second interface channel, different from the first interface channel, associated with a second transfer ring different from the first transfer ring; and
   providing, to the modem, an indication of one or more buffers associated with the first interface channel,
      wherein the indication of the one or more buffers comprises an indication of a respective software cookie associated with each of the one or more buffers.

2. The method of claim 1, wherein the first subset of the plurality of data packets comprises:
   a plurality of TCP segments associated with a same TCP flow,
      wherein the container comprises:
         a coalesced TCP frame having a coalescing frame header; or
   wherein the first subset of the plurality of data packets comprises:

a plurality of UDP packets associated with a same UDP stream,
wherein the container comprises:
a grouped UDP datagram having a single UDP header.

3. The method of claim 1, wherein a header associated with the container includes at least one of:
a context identifier field that identifies a context identifier associated with the container,
a checksum validity field that identifies whether a checksum error occurred for any of the plurality of data packets,
a checksum error bitmap field that identifies, if a checksum error occurred for any of the plurality of data packets, one or more data packets of the plurality of data packets associated with the checksum error,
a plurality of packet number packet length (NL) fields,
wherein each NL field identifies a quantity of the plurality of data packets that are a same packet length, or
an NL quantity field that identifies a quantity of NL fields included in the header.

4. The method of claim 1, wherein at least one of:
providing the indication of the one or more buffers comprises providing the indication via the first transfer ring; or
the method further comprising:
providing, to the modem, an indication, via the second transfer ring, of one or more second buffers associated with the second interface channel.

5. The method of claim 4, wherein transferring the container via the first interface channel comprises:
storing the container in the one or more buffers based at least in part on the indication of the one or more first buffers via the first transfer ring; and
wherein transferring the second subset of the plurality of data packets via a second interface channel comprises:
storing the second subset of the plurality of data packets in the one or more second buffers based at least in part on the indication of the one or more second buffers via the second transfer ring.

6. The method of claim 1, wherein the container is included among a plurality of containers to be transferred to the processor via the first interface channel; and
wherein transferring the container via the first interface channel comprises:
storing each of the plurality of containers in a respective buffer of the one or more buffers in an order that is based at least in part on respective activity levels of the plurality of containers.

7. The method of claim 1, wherein the indication of the one or more buffers is provided in a coalescing transfer ring element via the first transfer ring.

8. The method of claim 7, wherein transferring the container via the first interface channel comprises:
storing the container across the one or more buffers; and
providing, to the processor, using the modem, and based at least in part on storing the container, an indication of a coalescing completion event,
wherein the indication of the coalescing completion event is provided via a shared event ring associated with the first interface channel and the second interface channel, and
wherein the indication of the coalescing completion event identifies the respective software cookie associated with each of the one or more buffers and a coalescing context identifier associated with the container.

9. The method of claim 8, wherein transferring the second subset of the plurality of data packets comprises:
providing an indication of a completion event to the processor and using the modem,
wherein the indication of the completion event is provided via the shared event ring, and
wherein the indication of the coalescing completion event and the indication of the completion event are ordered in the event ring based at least in part on an order in which the container and the second subset of the plurality of data packets were transferred to the processor.

10. The method of claim 8, wherein storing the container across the one or more buffers comprises:
storing the container in a first buffer of the one or more buffers until the first buffer is filled;
closing the first buffer based at least in part on the first buffer being filled;
generating an event code and a context identifier associated with the first buffer; and
storing a remainder of the container in a second buffer of the one or more buffers.

11. The method of claim 1, wherein transferring the container via the first interface channel comprises:
transferring the plurality of containers via the first interface channel,
wherein each of the plurality of containers is associated with a respective TCP connection or UDP connection.

12. The method of claim 1, wherein grouping the payloads of the first subset of the plurality of data packets into the container comprises:
determining that the first subset of the plurality of data packets are capable of being coalesced; and
grouping the payloads of the first subset of the plurality of data packets into the container based at least in part on determining that the first subset of the plurality of data packets are capable of being coalesced; and
wherein transferring the second subset of the plurality of data packets via the second interface channel comprises:
determining that the second subset of the plurality of data packets are not capable of being coalesced; and
transferring the second subset of the plurality of data packets via the second interface channel based at least in part on determining that the second subset of the plurality of data packets are not capable of being coalesced.

13. The method of claim 12, wherein grouping the payloads of the first subset of the plurality of data packets into the container comprises:
closing the container; and
generating an event code and a context identifier associated with a buffer, of the one or more buffers, in which the container is to be stored.

14. The method of claim 13, wherein closing the container comprises at least one of:
identifying a flag, included in a data packet of the first subset of the plurality of data packets, that indicates that the container is to be closed, or determining that a data packet of the second subset of the plurality of data packets is not capable of being coalesced with the first subset of the plurality of data packets.

15. The method of claim 1, further comprising:
determining to transfer another container, of the plurality of containers, via the first interface channel; and
closing the second interface channel based at least in part on determining to transfer the other container via the first interface channel.

16. The method of claim 1, wherein the processor is:
an application processor, or
a host processor, and
wherein an interface, associated with the first interface channel and the second interface channel, is:
a peripheral component interconnect express interface,
a universal serial bus interface,
a serial ATA interface, or
an Ethernet interface.

17. The method of claim 1, wherein the first subset of the plurality of data packets are associated with a same flow or a same stream; and
the container includes a plurality of headers associated with the same flow or the same stream.

18. The method of claim 1, wherein grouping the payloads of the first subset of the plurality of data packets into the container comprises:
receiving, at the modem and from the processor, an indication of at least one of a threshold byte size for the container or a threshold quantity of data packets for the container; and
grouping, at the modem, the payloads of the first subset of the plurality of data packets into the container based at least in part on the at least one of the threshold byte size for the container or the threshold quantity of data packets for the container.

19. The method of claim 1, wherein the first subset of the plurality of data packets comprises:
a plurality of TCP segments,
a plurality of UDP packets,
a plurality of Ethernet frames, or
a plurality of unstructured packets.

20. A device for wireless communication, comprising:
a memory; and
one or more processors coupled to the memory, the one or more processors configured to:
receive a plurality of data packets at a modem of the device;
group, at the modem of the device, payloads of a first subset of the plurality of data packets into a container of a plurality of containers associated with a transmission control protocol (TCP) connection or user datagram protocol (UDP) connection;
transfer, from the modem and to a processor of the one or more processors, the container via a first interface channel associated with a first transfer ring;
transfer, from the modem and to the processor, a second subset of the plurality of data packets via a second interface channel, different from the first interface channel, associated with a second transfer ring different from the first transfer ring; and
providing, to the modem and using the processor, an indication of one or more buffers associated with the first interface channel,
wherein the indication of the one or more buffers comprises an indication of a respective software cookie associated with each of the one or more buffers.

21. The device of claim 20, wherein the first subset of the plurality of data packets comprises:
a plurality of TCP segments associated with a same TCP flow,
wherein the container comprises:
a coalesced TCP frame having a coalescing frame header; or
wherein the first subset of the plurality of data packets comprises:
a plurality of UDP packets associated with a same UDP stream,
wherein the container comprises:
a grouped UDP datagram having a single UDP header.

22. The device of claim 20, wherein the first subset of the plurality of data packets are associated with a same flow or a same stream; and
the container includes a plurality of headers associated with the same flow or the same stream.

23. The device of claim 20, wherein the one or more processors, when grouping the payloads of the first subset of the plurality of data packets into the container, are configured to:
receive, at the modem and from the processor, an indication of at least one of a threshold byte size for the container or a threshold quantity of data packets for the container; and
group, at the modem, the payloads of the first subset of the plurality of data packets into the container based at least in part on the at least one of the threshold byte size for the container or the threshold quantity of data packets for the container.

24. The device of claim 20, wherein a header associated with the container includes at least one of:
a context identifier field that identifies a context identifier associated with the container,
a checksum validity field that identifies whether a checksum error occurred for any of the plurality of data packets,
a checksum error bitmap field that identifies, if a checksum error occurred for any of the plurality of data packets, one or more data packets of the plurality of data packets associated with the checksum error,
a plurality of packet number packet length (NL) fields, wherein each NL field identifies a quantity of the plurality of data packets that are a same packet length, or
an NL quantity field that identifies a quantity of NL fields included in the header.

25. A non-transitory computer-readable medium storing one or more instructions for communication, the one or more instructions comprising:
one or more instructions that, when executed by one or more processors of a device, cause the one or more processors to:
receive a plurality of data packets at a modem of the device;
group, at the modem of the device, payloads of a first subset of the plurality of data packets into a container of a plurality of containers associated with a transmission control protocol (TCP) connection or user datagram protocol (UDP) connection;

transfer, from the modem and to a processor of the one or more processors, the container via a first interface channel associated with a first transfer ring;

transfer, from the modem and to the processor, a second subset of the plurality of data packets via a second interface channel, different from the first interface channel, associated with a second transfer ring different from the first transfer ring; and provide, to the modem and using the processor, an indication of one or more buffers associated with the first interface channel, wherein the indication of the one or more buffers comprises an indication of a respective software cookie associated with each of the one or more buffers.

26. The non-transitory computer-readable medium of claim 25, wherein the first subset of the plurality of data packets comprises:

a plurality of TCP segments associated with a same TCP flow, wherein the container comprises:

a coalesced TCP frame having a coalescing frame header; or wherein the first subset of the plurality of data packets comprises:

a plurality of UDP packets associated with a same UDP stream, wherein the container comprises:

a grouped UDP datagram having a single UDP header.

27. The non-transitory computer-readable medium of claim 25, wherein the first subset of the plurality of data packets are associated with a same flow or a same stream; and the container includes a plurality of headers associated with the same flow or the same stream.

28. An apparatus for wireless communication, comprising:

means for receiving a plurality of data packets at a modem of the apparatus;

means for grouping, at the modem of the apparatus, payloads of a first subset of the plurality of data packets into a container of a plurality of containers associated with a transmission control protocol (TCP) connection or user datagram protocol (UDP) connection;

means for transferring, from the modem and to a processor of the apparatus, the container via a first interface channel associated with a first transfer ring;

means for transferring, from the modem and to the processor, a second subset of the plurality of data packets via a second interface channel, different from the first interface channel, associated with a second transfer ring different from the first transfer ring; and means for providing, to the modem and using the processor, an indication of one or more buffers associated with the first interface channel, wherein the indication of the one or more buffers comprises an indication of a respective software cookie associated with each of the one or more buffers.

29. The apparatus of claim 28, wherein the first subset of the plurality of data packets comprises:

a plurality of TCP segments associated with a same TCP flow, wherein the container comprises:

a coalesced TCP frame having a coalescing frame header; or wherein the first subset of the plurality of data packets comprises:

a plurality of UDP packets associated with a same UDP stream, wherein the container comprises:

a grouped UDP datagram having a single UDP header.

30. The apparatus of claim 28, wherein the first subset of the plurality of data packets are associated with a same flow or a same stream; and the container includes a plurality of headers associated with the same flow or the same stream.

* * * * *